United States Patent [19]

Kondo et al.

[11] Patent Number: 5,092,974
[45] Date of Patent: Mar. 3, 1992

[54] ELECTRODE AND METHOD FOR COMPRESSIVE AND ELECTRO-OSMOTIC DEHYDRATION

[75] Inventors: Shiro Kondo, Shijimi; Takeshi Suwa, Satsukidai; Shigeru Sano, Ikoma; Kishio Miwa; Tamotsu Takizawa, both of Sonoyama, all of Japan

[73] Assignees: Shinko Pantec Co., Ltd., Kobe; Toray Industries, Inc., Tokyo, both of Japan

[21] Appl. No.: 470,324

[22] Filed: Jan. 25, 1990

[51] Int. Cl.⁵ .................. B01D 13/02; B01D 35/06; C02F 11/12
[52] U.S. Cl. ................ 204/182.2; 204/180.1; 204/294; 204/299 R; 204/300 R
[58] Field of Search ............... 204/294, 182.2, 300 R, 204/299 R, 180.1

[56] References Cited

U.S. PATENT DOCUMENTS

| | | | |
|---|---|---|---|
| 3,773,640 | 11/1973 | Burrage et al. | 204/180 R |
| 4,168,222 | 9/1979 | Freeman | 204/182.2 |
| 4,244,804 | 1/1981 | Moeglich | 204/300 R |
| 4,367,132 | 1/1983 | Bell et al. | 204/182.2 |
| 4,600,486 | 7/1986 | Oppitz | 204/182.3 |
| 4,814,307 | 3/1989 | Funabashi et al. | 204/294 |

FOREIGN PATENT DOCUMENTS

62-125811 6/1987 Japan.
63-254669 10/1988 Japan.
1-186316 2/1989 Japan.

*Primary Examiner*—John Niebling
*Assistant Examiner*—Arun S. Phasge
*Attorney, Agent, or Firm*—Marshall, O'Toole, Gerstein, Murray & Bicknell

[57] ABSTRACT

An electrode comprising a carbonaceous material including carbon fibers, which are bound together by means of carbon atoms. It is preferable that 10–50 w/w % of the carbonaceous material are short carbon fibers 2–20 mm long, which are dispersed and stacked in random directions substantially in a two-dimensional plane and shaped into a plate or sheet, in which the fibers bind to each other by means of carbon atoms to form a carbonaceous electrode. The invention further comprises the method of compressive and electro-osmotic dehydration, wherein direct current is flowed between the electrode, and the polarity is reversed after each predetermined amount of current flow.

3 Claims, 3 Drawing Sheets

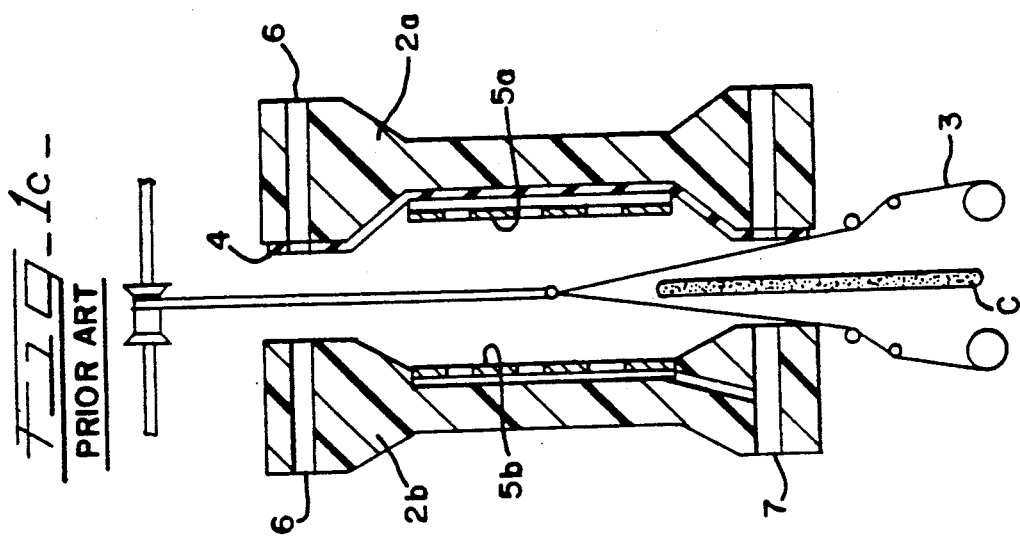
FIG-1c- PRIOR ART
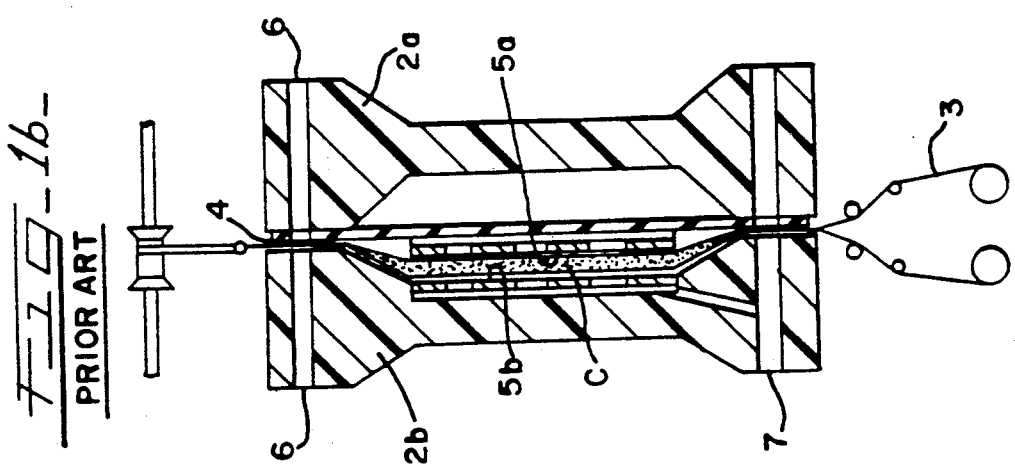
FIG-1b- PRIOR ART
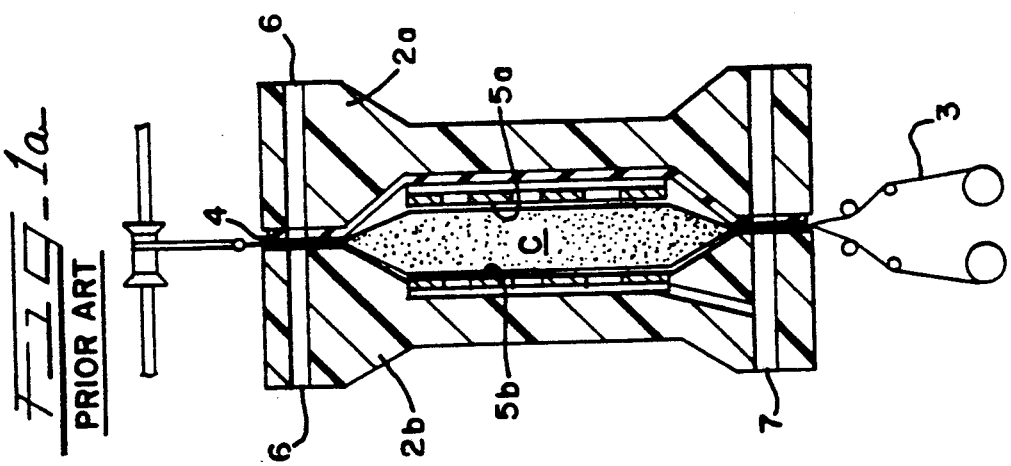
FIG-1a- PRIOR ART even though they are ionized by the application of direct current and

ELECTRODE AND METHOD FOR COMPRESSIVE AND ELECTRO-OSMOTIC DEHYDRATION

FIELD AND BACKGROUND OF THE INVENTION

The present invention relates to an electrode for a compressive and electro-osmotic dehydrator of the filter-press type, wherein liquid containing solids, such as sludge or slurry of service water or sewage, is dehydrated under pressure, and treated electro-osmotically to improve the dehydration. This invention also relates to a method of compressive and electro-osmotic dehydration.

Compressive and electro-osmotic dehydrators of the filter-press type having press diaphragms are shown in Japanese Provisional Patent Publications No. S. 62-125810, No. S. 62-125811, and No. S. 62-125812 of Shinko Pfaudler Co., Ltd. (now Shinko Pantec Co., Ltd.), all laid open on June 8, 1987.

FIGS. 1a-1c herein show steps in the operation of this type of conventional dehydrator, which includes press plates 2a and 2b and a pair of filter cloths 3 between them. The plate 2a has a diaphragm 4 supporting an electrode plate 5a. The other plate 2b has an electrode plate 5b fixed to it.

In the first step shown in FIG. 1a, the press plates 2a and 2b are closed to form a sealed space between them. A liquid containing solids is pumped through passages 6 and squeezed between the cloths 3. An amount of liquid filtrate permeates through the cloths 3 and drains through small holes in the electrodes 5a and 5b and through passages 7. This procedure produces a cake c of sludge and constitutes primary dehydration.

In the second step shown in FIG. 1b, compressed air is supplied to the space between the plate 2a and the diaphragm 4, which swells the diaphragm and compresses the sludge cake c, for example, at 3 kg/cm² for 20 minutes. This further dehydrates the cake down to a water content of 80-85%, and constitutes secondary dehydration.

In a later stage of this step, direct current (DC) voltage is applied, for example, at 40 volts for 15 minutes between the electrodes 5a and 5b. This causes electro-osmosis to further promote the dehydration, and constitutes tertiary dehydration. As a result, the water content is reduced to about 50% and the cake volume is greatly reduced.

In the last step shown in FIG. 1c, the press plates 2a and 2b are opened and the cloths 3 are lowered in order to remove the finally dehydrated cake c.

Electrodes for use in such a dehydrator have been composed of various materials comprising metallic plates and sintered carbon plates and various structures which are suited to the different types of dehydrators. Nevertheless, they have had the following problems:

To take full advantage of the utility of compressive and electro-osmotic dehydration, it is of dominant importance to improve the function and durability of the electrodes, which play a major role in the dehydration process, without unreasonably increasing the cost of the electrodes, which account for nearly half of the total cost of the dehydrator. From this viewpoint, typical conventional electrodes have the following problems:

The electrodes composed of conventional metallic plates such as stainless steel and nickel steel have sufficient strength, but they have a short service life because they are ionized by the application of direct current and consumed by elution into the slurry. In addition, eluted metal ions, particularly those of chromium, cause a secondary pollution issue.

The electrodes composed of titanium alloys, plated with noble metals such as platinum, are less consumed by the application of direct current and are functionally excellent; however, they are too expensive for practical use. Moreover, in some processes of electro-osmosis, temporal reversion of polarity proves useful, but this creates a problem since the platinum plating peels off at the time of polarity reversal.

The conventional sintered carbon plates are less likely to be eluted by the application of current; however, they are not satisfactory in terms of service life since their binder coke is selectively corroded by oxidation consumption due to nascent oxygen, thereby causing carbon particles to fall off. Moreover, the sintered carbon plates have a low mechanical strength and are damaged owing to compressive loads during operation. In Japanese Provisional Patent Publication No. S. 60-147208, a pressure-molded electrode made of conductive fibers and a synthetic resin has been proposed in order to resolve this drawback. However, this electrode contains insulating resin, which reduces its conductivity and increases the voltage drop in the electrode. This requires the applied voltage to be increased in order to carry a specified quantity of electricity for electro-osmotic dehydration. Consequently, not only is the service cost increased, but the service life of the electrode is also shortened, which is not economical. In addition, the use of this electrode is not advisable since there is a risk of electric shock in a working environment using both water and high voltages.

Furthermore, when compared with mechanical compression dehydration with a filter press alone, compressive and electro-osmotic dehydration requires lower pressures, but the electrode for this dehydration must withstand at least these pressures as this dehydration also employs compression dehydration. The electrode for an electro-osmotic dehydrator of the filter-press type needs to withstand the bending stress exerted by the diaphragm 4 (FIGS. 1a-1c), and it also must have a sufficient mechanical strength to withstand the thermal stress occurring due to a difference in thermal expansion of the filter plates 2a and 2b and the electrodes 5a and 5b during heat generation (70°-80° C.) in the last phase of dehydration. These requirements cause a problem particularly if the area of compression is large or if the electrode becomes thin due to erosion.

As described above, the usefulness of the electro-osmotic dehydration method is recognized although, because of its drawbacks or problems related to the conventional electrodes at the present time, this method has not yet been established as a sufficiently economical dehydration method.

It is an object of this invention to resolve the problems of the electrode associated closely with the conventional method of compressive and electro-osmotic dehydration and provide an electrode for use in such dehydration which is highly efficient, has high strength and long service life, and can be manufactured comparatively easily at a reasonable cost.

Another object of this invention is to provide a method for electro-osmotic dehydration using such an electrode.

SUMMARY OF THE INVENTION

An electrode according to this invention comprises a carbonaceous material including carbon fibers, which are bound together by means of the carbon. It is preferable that 10-15 w/w % of the carbonaceous material are short carbon fibers 2-20 mm long, which are dispersed and stacked in random directions substantially in a two-dimensional plane and shaped into a plate or sheet, in which the fibers bind to each other by means of the carbon to form a carbonaceous electrode.

The invention further comprises the method of compressive and electro-osmotic dehydration, wherein direct current is flowed between the electrode, and the polarity is reversed after each predetermined amount of current flow.

BRIEF DESCRIPTION OF THE DRAWINGS

Preferred embodiments of the invention are described below with reference to the accompanying drawings, wherein:

FIG. 1a-1c are schematic cross-sectional views showing the basic construction and steps of operation of a prior art dehydrator;

FIG. 3b is an elevational view in cross section taken along line 3b—3b of FIG. 3a;

DETAILED DESCRIPTION OF THE DRAWINGS

Figure 2:
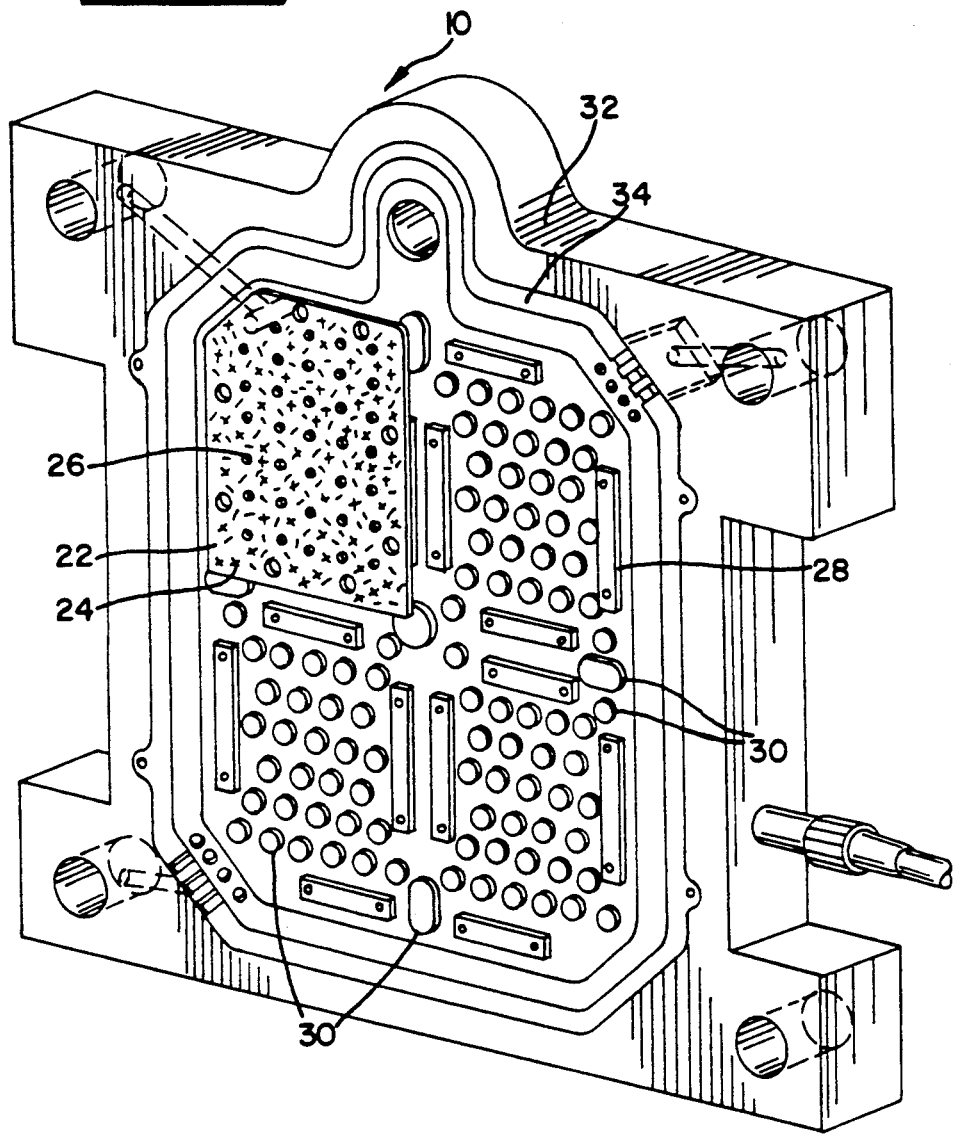
FIG. 2 is a perspective view of a press plate of a dehydrator including electrodes according to this invention.

With reference to FIG. 2, a press plate 10 has four (only one shown) generally rectangular electrode plates 22 on each of its sides. Each electrode 22 is formed from carbonaceous material containing carbon fibers 24 and has a number of small holes 26 formed through it, for the passage of a liquid filtrate from sludge (part c in FIGS. 1a-1c). Each electrode 22 is secured to four elongated electric conductors 28 and is also supported by a number of projections 30 formed on a flexible rubber diaphragm 34, which is attached to a frame 32. The conductors 28 extend along the edges of the plates and the projections 30 support the center area of the plates. The conductors 28 are connected to a DC power supply during use and the DC potential appears across adjacent plates 22.

Manufacturing Method

A method of manufacturing an electrode 22 of this invention is explained below with regard to its characteristics:

Materials for the short carbon fibers 24 may include polyacrylonitrile carbon fibers, pitch carbon fibers and rayon carbon fibers. Short carbon fiber materials are usually obtained by cutting and opening continuous fiber bundles. Fiber bundles are adhered by a synthetic-resin binder such as epoxy resin adhesive. In order to improve the dispersibility of short carbon fibers in the subsequent process of screening, such a binder is removed.

It is preferable that each short carbon fiber has a 4-15 $\mu$m diameter and a 2-20 mm length.

The short fibers are made into a sheet or plate as an intermediate material. In order to form this sheet, the fibers and screening media including a screening binder are mixed, stirred, and screened on a cloth or a wire net. By the screening, the fibers are dispersed in random directions substantially in a plane and bound to each other by the binder into sheet form. The screening binder may be polyvinyl alcohol, hydroxyethyl cellulose, polyethylene oxide, polyacrylamide or polyester, which is diluted in some solvent such as water to serve as a screening medium. After screening, the short carbon fiber sheet is heated and dried to remove the solvent.

The sheet of intermediate material is impregnated with a resin solution which can be carbonized when heated at high temperature. The resins for this purpose may include phenolic resin, epoxy resin, furan resin, pitch or any mixture of these, and the solvents used for them may include methanol.

After impregnation with resin, the sheet is hot-pressed so as to harden the resin, at which time the sheet is stacked in order to obtain the required thickness.

The sheet after hot-pressing is heated at a high temperature of 650°-3,000° C. in an atmosphere of inert gas such as nitrogen and argon or in vacuum. The resin with which the sheet has been impregnated is carbonized by this heating and provides the binding carbon for the short carbon fibers. The screening binder is heat-degraded and scattered. In this way, the electrode of this invention is obtained.

Relationship between the Characteristics of the Electrode of This Invention and its Manufacturing Conditions In terms of mechanical strengths, the use of polyacrylonitrile carbon fibers is preferable. The longer the short carbon fibers in the electrode, the greater is its binding strength, which is considered to be important among mechanical strengths. If, however, the fibers are excessively long, their uniform dispersion is difficult to achieve and the bending strength will hardly be increased.

As regards the electric conductivity of the electrode, the specific resistance in the thickness direction decreases rapidly with an increase in the amount of binding carbon obtained by carbonizing the impregnating resin used for the intermediate material. If the amount of resin is small, the binding ability between the carbon fibers is reduced, thus lowering the mechanical strengths of the electrode.

When the intermediate material subjected to resin impregnation and hot-press molding is heated to carbonize the resin, part of the resinous components is decomposed and scattered to form pores in the electrode. If required for mechanical strength, at least part of these pores may be further filled with a filler resin or an elastomer. Carbonization of the filled resin or elastomer by heating the electrode would be also preferable. The filler resin may include thermosetting resins such as epoxy resin, unsaturated polyester resin and phenolic resin, and thermoplastic resins such as polyamide resin, polyethylene resin, polypropylene resin, polystyrene resin, polyvinyl chloride resin, acrylonitrile-butadien-styrene resin, polyphenylene sulfide resin, polyether ketone resin and polytetrafluoroethylene. The elastomer may include acrylobutadien elastomer, silicone elastomer, chloroprene elastomer and ethylene-propylene elastomer. After further filling of resin, filled resin may be carbonized again.

EXAMPLE 1

The polyacrylonitrile based carbon fibers, "Torayca" T300 (Toray Industries, Inc.), were cut in lengths of 12 mm, dispersed in water, and screened. Polyvinyl alcohol was used as the binder.

The screened sheet was impregnated with phenolic resin, dried and hot-pressed to harden the resin. The sheet was then baked at 1600° C. in an atmosphere of nitrogen to carbonize the resin. This produced an electrode having a thickness of approximately 1 mm, a bulk density of approximately 1.05 g/cm$^3$ and an approximately 40% porosity.

The electrode thus obtained had a compressive strength of 100 kg/cm$^2$ or more and an electric resistivity in the thickness direction of 0.015 $\Omega$cm.

The resistivity is calculated using the following equation from the voltage drop when the carbon electrode is sandwiched by mercury electrodes of a given area, between which a given current is applied:

$$R = (\text{Voltage drop} \times \text{Electrode area}) / (\text{Current} \times \text{Thickness})$$

Electrochemical Corrosion Test

Figure 3A:
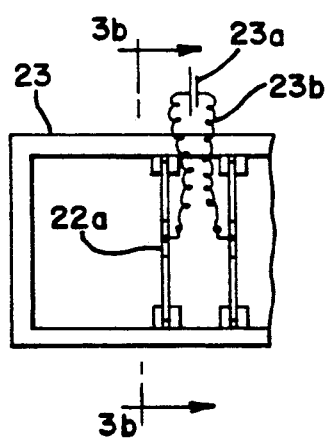
FIG. 3a is a fragmentary plan view of a device for testing the volumetric reduction due to erosion of electrodes.
Figure 3B:
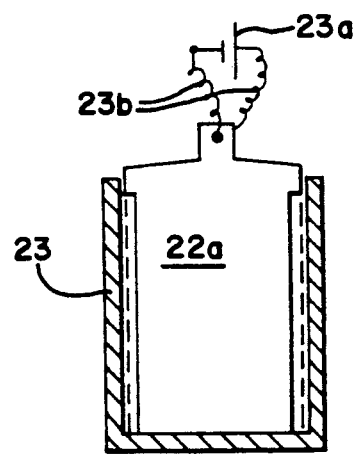

As illustrated in FIGS. 3a and 3b, two samples of the electrodes 22a of this invention were immersed in a bath solution in a liquid tank 23 in order to measure the corrosion amount on the electrodes as the positive poles through the application of direct current. A DC source 23a was connected by wires 23b to two adjacent electrodes 22a. The area of each electrode to which current was applied and the interval between the electrodes are shown in FIGS. 3a and 3b. The bath solution was an aqueous solution of Na$_2$SO$_4$ 2g/L with a fixed conductivity of 2 mS/cm, and the current was fixed at 0.02 A/cm$^2$ by constant-current control. The following table shows the corrosion amount of each electrode with time passage. A similar test was then made with two electrodes 22b (not shown) which were comparative electrodes. The results are shown in the following table:

| Type of electrode | Results of Corrosion Aamount | Corrosion Amount (g/AH) |
|---|---|---|
| Electrode 22a of this invention | | 0.03 |
| Comparative electordes 22b | (Platinum-plated titanium material) | nearly 0 |
| | (SUS304 stainless steel) | 0.1175 |
| | (Glasslike carbon material) | 0.11 |
| | (Oscillation-molded carbon material) | 0.06 |
| | (Graphitized glasslike carbon material) | 0.09 |
| | (Carbon molded product) | 0.07 |

The electrode 22a of this invention had an extremely low corrosion amount regardless of the polarity. The comparative electrode of Platinum-plated titanium material as the positive pole had a corrosion amount of nearly zero (0), but the electrode could not be used as the negative pole. A different comparative electrode was used as the negative pole. The four comparative carbon material electrodes, which were free of carbon fibers, showed fall off of carbon particles remarkably.

As described above, the electrode of this invention comprises a carbonaceous material in which carbon fibers are bound by carbon is excellent in both mechanical strength and electrical conductivity. Moreover, this electrode is durable when used either as a positive or a negative pole. Consequently, by using this electrode, it is possible to carry out economically compressive and electro-osmotic dehydration with a high moisture-removal efficiency.

On the other hand, however, when this electrode was used in an electro-osmotic dehydration test, there developed a specific prohibitive phenomenon that does not occur with conventional sintered carbon plate electrodes which do not contain carbon fibers; that is, when direct current is applied between conventional sintered carbon plates as both poles, they simply are consumed, whereas when direct current is applied between the electrode plates, since both poles are comprised of carbon material containing carbon fibers, over a long period of time, the current suddenly becomes difficult to flow at a certain point in time.

In order to elucidate this phenomenon in which it is almost impossible to flow the direct current, the surface of the electrodes was analyzed by the ESCA (Electron Spectroscopy for Chemical Analysis) technique, which revealed a large quantity of oxygen atoms bound to the surface of the carbon material of the electrode used as the positive pole. It is believed that an insulating layer of oxidized matter is formed on the surface of the carbon material.

In order to resolve this problem, the inventors herein have developed a method or means for effectively using the electrodes of this invention, which have other excellent characteristics. This method comprises holding sludge between two poles made of material containing carbon fibers, compressively and electro-osmotically dehydrating the sludge with continuous application of direct current between the poles and reversing the polarity of the current after each preset quantity of electricity per unit area of the electrode.

In the prior art electro-osmotic dehydration, the direction of current may be reversed at the last phase of dehydration in order to improve the dehydrating properties or prevent contamination of the electrode surfaces. This prior art practice is the procedure of this invention wherein a continuous application of direct current in one direction is provided until the polarity is reversed after a preset quantity.

Regarding this point in the method of this invention, it is preferable that the continuously applied quantity of electricity per unit area of the electrode until the polarity is switched, does not exceed 700 coulomb/cm$^2$, and there is no particularly strict lower limit. It is more preferable that the polarity is reversed within the quantity of electricity of 500 coulomb/cm$^2$.

If cyclic electro-osmotic dehydration is carried out according to the method of this invention, it is preferable to reverse the polarity each time approximately 20 cycles of dehydration operation have been completed, although this number depends on the quantity of electricity per cycle. It is more preferable to reverse the polarity after each five cycles. In order to achieve an effective electro-osmotic dehydration, the current density per unit area of the electrodes should preferably be maintained at the order of 0.001–0.1 A/cm$^2$.

In order to increase the conductivity of the sludge, an electrolyte such as sodium chloride, sodium sulfate, calcium chloride, and sodium carbonate may be added to the sludge beforehand.

According to the method of this invention, it is possible to electro-osmotic dehydrate sludge with the use of electrodes, which are comprised of carbonaceous material containing carbon fibers, at both poles, while taking benefits from the excellent characteristics of the electrodes in terms of mechanical strength, electrical conductivity and corrosion-resistivity, and continue electro-osmotic dehydration without causing the inhibitory phenomenon of applied current derived from continued application of direct current in the same direction.

EXAMPLE 2

The polyacrylonitrile based carbon fibers, "Torayca" T300 (Toray Industries, Inc.), were cut in lengths of 12 mm, dispersed in an aqueous solution of polyvinyl alcohol, and screened. The screened sheet was impregnated with phenolic resin. Next, the sheet was baked at 1600° C. in an atmosphere of nitrogen to carbonize the resin, whereby an electrode, which has approximately 1 mm of thickness, 1.05 g/cm$^3$ of bulk density, and a 40% porosity, was obtained.

The electrode thus obtained had a compressive strength of 100 kg/cm$^2$ or more and an electrical resistivity in the thickness direction of 0.015 Ωcm.

Figure 4:
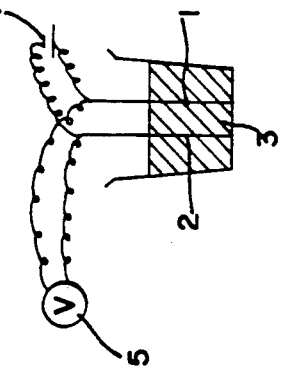
FIG. 4 is a schematic view of a device for electrically testing an electrode.
Figure 5:
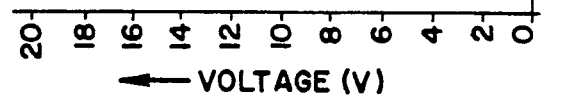

As illustrated in FIG. 4, two such electrodes were used as both the positive pole 1 and negative pole 2 in an aqueous solution 3 of Na$_2$SO$_4$ 1.5 g/L. A current density of 0.02 A/cm$^2$ was applied from a direct current source 4. As shown in FIG. 5 where the abscissa represents time and the ordinate the voltage (V) of a voltmeter 5, the voltage increased suddenly and the current was interrupted in about eleven hours of current application. The applied cumulative quantity of electricity was 0.02×11×3600=792 coulomb/cm$^2$ or less. According to this invention, by reversing the polarity at the quantity of electricity of 700 coulomb/cm$^2$ or less, the current application was able to continue to avoid the interrupted state.

Figure 6:
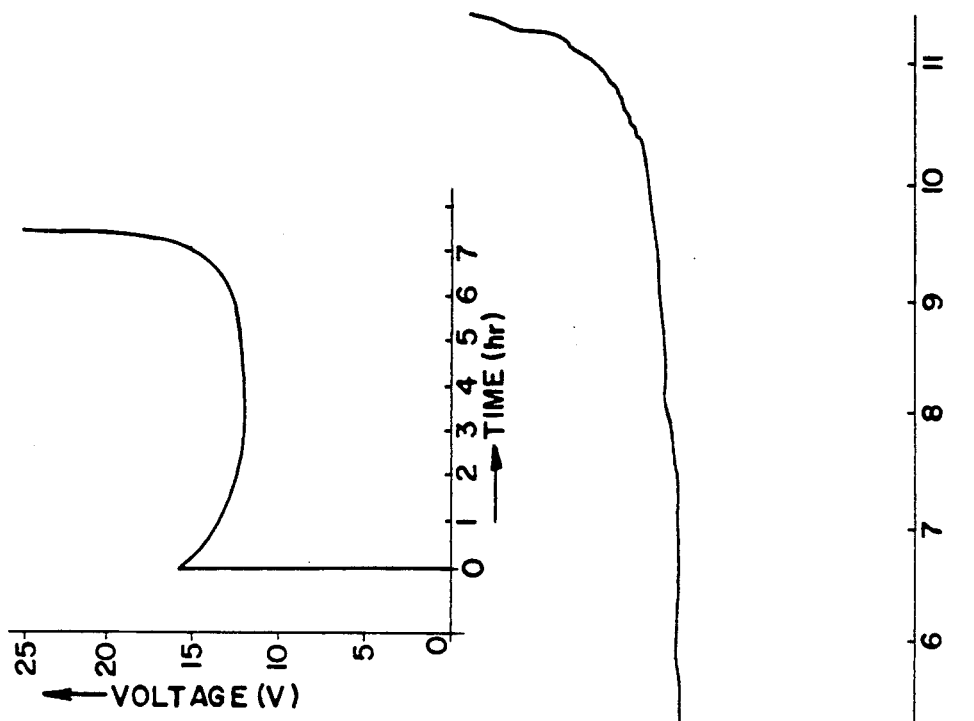
FIGS. 5 and 6 are charts each showing a result of an electric test for one example.

In a similar manner, when a current density of 0.04 A/cm$^2$ was applied in an aqueous solution of NaCl 1.4 g/L, a time function of current application was obtained as shown in FIG. 6 where the abscissa represents time and the ordinate the voltage (V). The voltage decreased instead in the early phase of current application but increased suddenly in about seven hours of current application. The cumulative quantity of electricity was 0.04×7×3600=1008 coulomb/cm$^2$. In this invention, if the polarity is reversed in the previous stage at, for example, 700 coulomb/cm$^2$ or less, the current can be applied continuously.

In a similar manner, when a current density of 0.04 A/cm$^2$ was applied, in an aqueous solution of Na$_2$SO$_4$ 2g/L, an interruption occurred in about six hours of current application. The cumulative quantity of electricity was 0.04×6×3600=864 coulomb/cm$^2$. In this invention, if the polarity is reversed in the previous stage, for example, at 700 coulomb/cm$^2$ or less, the current can be applied continuously.

As described above, according to the electro-osmotic dehydration method of this invention by using an electrode comprised of carbonaceous material in which the carbon fibers are bound together, it can take full advantage of carbon fibers in terms of mechanical strength and electrical conductivity. Furthermore, by using this electrode for both poles, and applying direct current continuously, with the polarity switched at a predetermined quantity of cumulated electricity, an interrupted state can be avoided and continuous electro-osmotic dehydration can be carried out.

What is claimed is:

1. A method of compressive and electro-osmotic dehydration of a liquid containing solids in a series of dehydration cycles each of which includes dehydrating a quantity of the liquid, discharging the quantity and receiving another quantity, comprising the steps of:
   (a) in each of said cycles feeding a quantity of the liquid between positive and negative electrodes each of which comprises a carbonaceous plate containing carbon fibers, compressing the quantity of liquid by moving at least one of aid electrodes toward the other of said electrodes;
   (b) applying direct current between said electrodes for at least a part of the compression portion of each cycle; and
   (c) reversing the polarity of said electrodes after each predetermined amount of cumulated electricity for preventing a formation of insulating layer on one of said electrodes, said reversal of polarity taking place during one of said cycles or after a plurality of said cycles.

2. A method according to claim 1, wherein said amount of cumulated electricity is not more than 700 coulomb/cm$^2$ per unit area on said electrode.

3. A compressive and electro-osmotic dehydrator of the filter-press type for a liquid containing solids, which comprises a pair of press plates adapted to form a space therebetween and to move relative to each other so as to change the width of said space, and a pair of electrodes supported respectively by said press plates to be located in said space, said electrodes having a number of small holes formed therethrough for passing a liquid, each of said electrodes comprising a carbonaceous plate containing carbon fibers being 2–20 mm long, the content of said fibers being 10–50 w/w % of said carbonaceous plate and being dispersed and stacked in random directions in a two-dimensional plane along a surface of said carbonaceous plate.

* * * * *